US 8,654,840 B2

(12) United States Patent
Ou et al.

(10) Patent No.: US 8,654,840 B2
(45) Date of Patent: Feb. 18, 2014

(54) RATE CONTROL METHOD OF PERCEPTUAL-BASED RATE-DISTORTION OPTIMIZED BIT ALLOCATION

(75) Inventors: Tao-Sheng Ou, Taipei (TW); Yi-Hsin Huang, Taipei (TW); Po-Yen Su, Taipei (TW); Homer H. Chen, Taipei (TW)

(73) Assignee: National Taiwan University, Taipei (TW)

(*) Notice: Subject to any disclaimer, the term of this patent is extended or adjusted under 35 U.S.C. 154(b) by 649 days.

(21) Appl. No.: 12/832,495

(22) Filed: Jul. 8, 2010

(65) Prior Publication Data
US 2011/0310962 A1 Dec. 22, 2011

(30) Foreign Application Priority Data
Jun. 22, 2010 (TW) .............................. 99120185 A

(51) Int. Cl.
*H04N 7/12* (2006.01)
*H04N 11/02* (2006.01)
*H04N 11/04* (2006.01)

(52) U.S. Cl.
USPC ............. 375/240.03; 375/240.24; 375/240.26

(58) Field of Classification Search
None
See application file for complete search history.

(56) References Cited

U.S. PATENT DOCUMENTS

| 6,546,050 | B2 * | 4/2003 | Ramaswamy | ........... 375/240.03 |
| 7,397,855 | B2 | 7/2008 | Chen | |
| 2004/0081236 | A1 * | 4/2004 | Seo | ......................... 375/240.03 |
| 2009/0046778 | A1 | 2/2009 | Lee et al. | |
| 2011/0142124 | A1 * | 6/2011 | Huang et al. | ............. 375/240.02 |
| 2011/0255589 | A1 * | 10/2011 | Saunders et al. | ......... 375/240.01 |

OTHER PUBLICATIONS

"On Lagrange Multiplier and Quantizer Adjustment for H.264 Frame-Layer Video Rate Control" Jiang, Minqiang and Ling, Nam (IEEE Transactions on Circuits and Systems for Video Technology, vol. 16 No. 5 May 2006).*
"Perceptual Video Coding with H.264" Koohyar Minoo and Truong Q. Nguyen, ECE Dept, UCSD Lajolla CA, 2005.*

* cited by examiner

*Primary Examiner* — Joseph Ustaris
*Assistant Examiner* — Kevin McInnish
(74) *Attorney, Agent, or Firm* — Stout, Uxa, Buyan & Mullins, LLP

(57) ABSTRACT

A rate control method of perceptual-based rate-distortion (R-D) optimized bit allocation is disclosed. An input frame is firstly determined as a key frame or non-key frame. A key frame is additionally encoded to generate rate-distortion (R-D) points. The R-D model of each basic unit (BU) is updated, followed by perceptual-based bit allocation, thereby generating a target bit rate. A quantization parameter (QP) is computed according to the target bit rate, and the current BU is encoded according to the QP. A rate-quantization (R-Q) model is updated if not all BUs have been encoded.

20 Claims, 2 Drawing Sheets

RATE CONTROL METHOD OF PERCEPTUAL-BASED RATE-DISTORTION OPTIMIZED BIT ALLOCATION

CROSS-REFERENCE TO RELATED APPLICATIONS

The entire contents of Taiwan Patent Application No. 099120185, filed on Jun. 22, 2010, from which this application claims priority, are incorporated herein by reference.

BACKGROUND OF THE INVENTION

1. Field of the Invention

The present invention generally relates to a rate control method, and more particularly to a rate control method of perceptual-based rate-distortion (R-D) optimized bit allocation.

2. Description of Related Art

The goal of rate control in video coding is to regulate encoded bit stream without violating the constraints imposed by the encoder/decoder buffer size and the available channel bandwidth. The rate-distortion optimization (RDO) framework is employed in an H.264 coder to achieve a better tradeoff between rate and distortion. However, the RDO framework makes the rate control for H.264 more complicated. The reason is that the RDO process cannot proceed without quantization parameter (QP) being determined beforehand; on the other hand, some models such as rate-distortion (R-D) model and distortion-quantization (D-Q) model used to determine QP require the statistics generated from the RDO (a well-known chicken-and-egg dilemma).

Bit allocation and control methods have been conventionally proposed, some of which include R-D optimization but use distortion metrics such as mean square error (MSE) that are poorly correlated with perceptual quality because they do not take the characteristics of human visual system into consideration; while the others of which use perceptual-based metrics but do not take account of the R-D optimization.

Since the ultimate receivers of encoded video are human eyes, a need has arisen to propose a rate control method of both perceptual-based and rate-distortion (R-D) optimization to improve video quality.

SUMMARY OF THE INVENTION

In view of the foregoing, it is an object of the embodiment of the present invention to provide a rate control method of perceptual-based rate-distortion (R-D) optimized bit allocation, for more effectively decreasing bit rate while preserving more structural information compared to conventional methods, thereby improving the perceptual quality of the encoded video.

According to one embodiment, an input frame is firstly determined as a key frame or a non-key frame. If the input frame is determined as the key frame, the key frame is additionally encoded at least one time, thereby generating a corresponding R-D point. An R-D model of each basic unit (BU) is updated, and perceptual-based bit allocation is performed, thereby generating a target bit rate for each BU. A quantization parameter (QP) is computed according to the target bit rate, and the current BU is encoded according to the QP. If not all the BUs have been encoded, a rate-quantization (R-Q) model is then updated.

DETAILED DESCRIPTION OF THE INVENTION

An embodiment of the present invention discloses a rate control method of perceptual-based rate-distortion (R-D) optimized bit allocation for video coding. The embodiment is adaptable, but not limited, to a digital still camera, a digital video camera or a mobile phone with camera for effectively performing bit rate allocation and control. Although the embodiment is exemplified by H.264 video coding, the present invention may be adaptable to other applications as well.

In the embodiment, each frame is divided into a number of basic units (BUs), each of which includes a number of, e.g., 11, macroblocks (MBs). With respect to each BU, a structural similarity (SSIM) index is used to construct a rate-distortion (R-D) model for bit allocation. A distortion metric $D_{SSIM}$ (or abbreviated as D) may be expressed as follows:

$$D(R)=1-SSIM(R)$$

where R is the bit rate.

Figure 1:
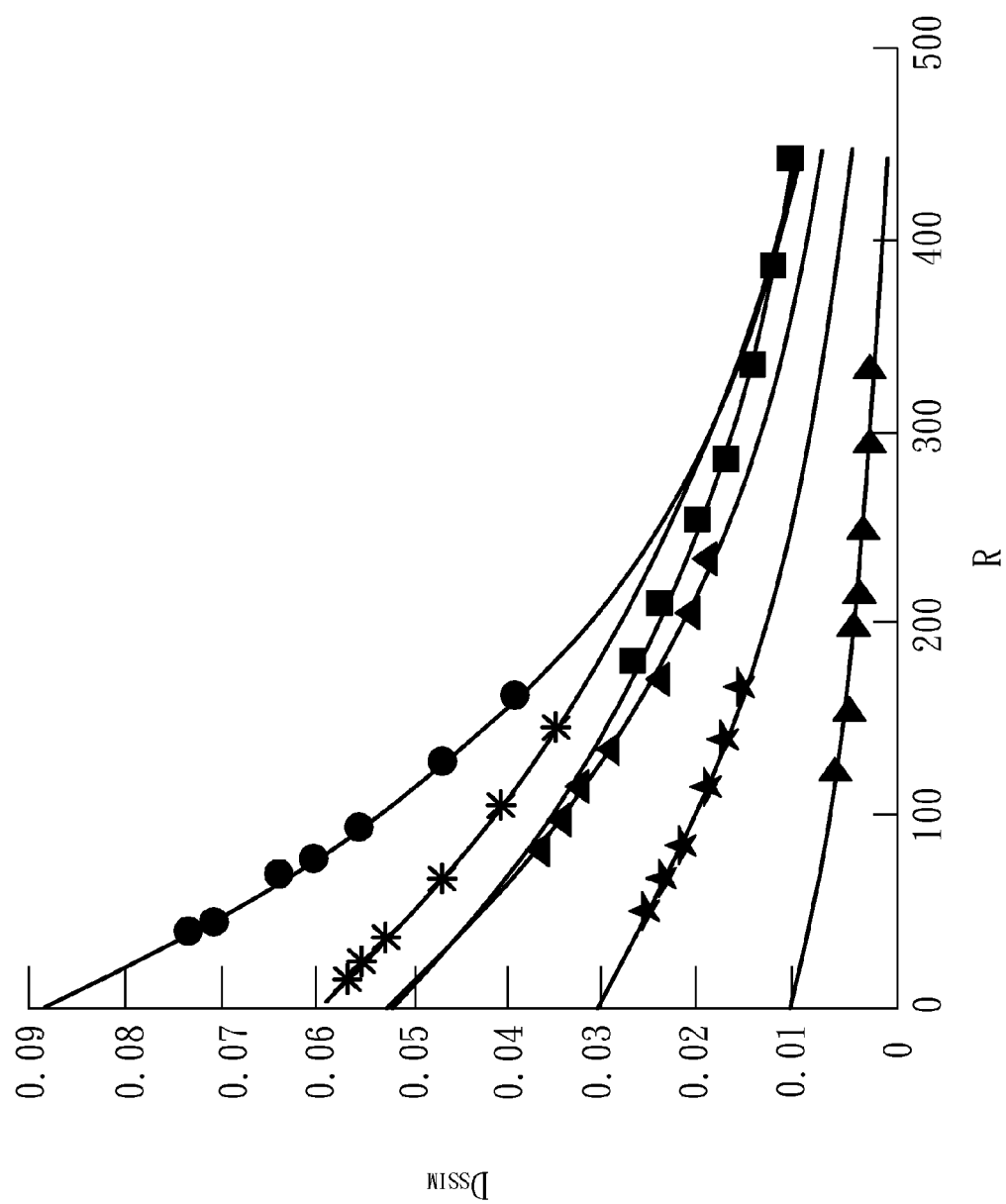
FIG. 1 shows exemplary R-D points of some basic units (BUs)

FIG. 1 shows exemplary R-D points of some BUs. It can be seen that the R-D characteristic of each BU is very distinct from the R-D characteristic of others. The bit allocation may thus be effectively performed in the embodiment based on the distinctness. Moreover, the R-D points of each BU may be well fitted by a power function, and the R-D model of the embodiment may be expressed as $$D(R)=\alpha e^{-\beta R}$$

where $\alpha$ and $\beta$ are model parameters, which are positive.

According to some experimental results, the R-D model works well no matter whether the rate consists of texture and header bits or simply texture bits.

Figure 2:
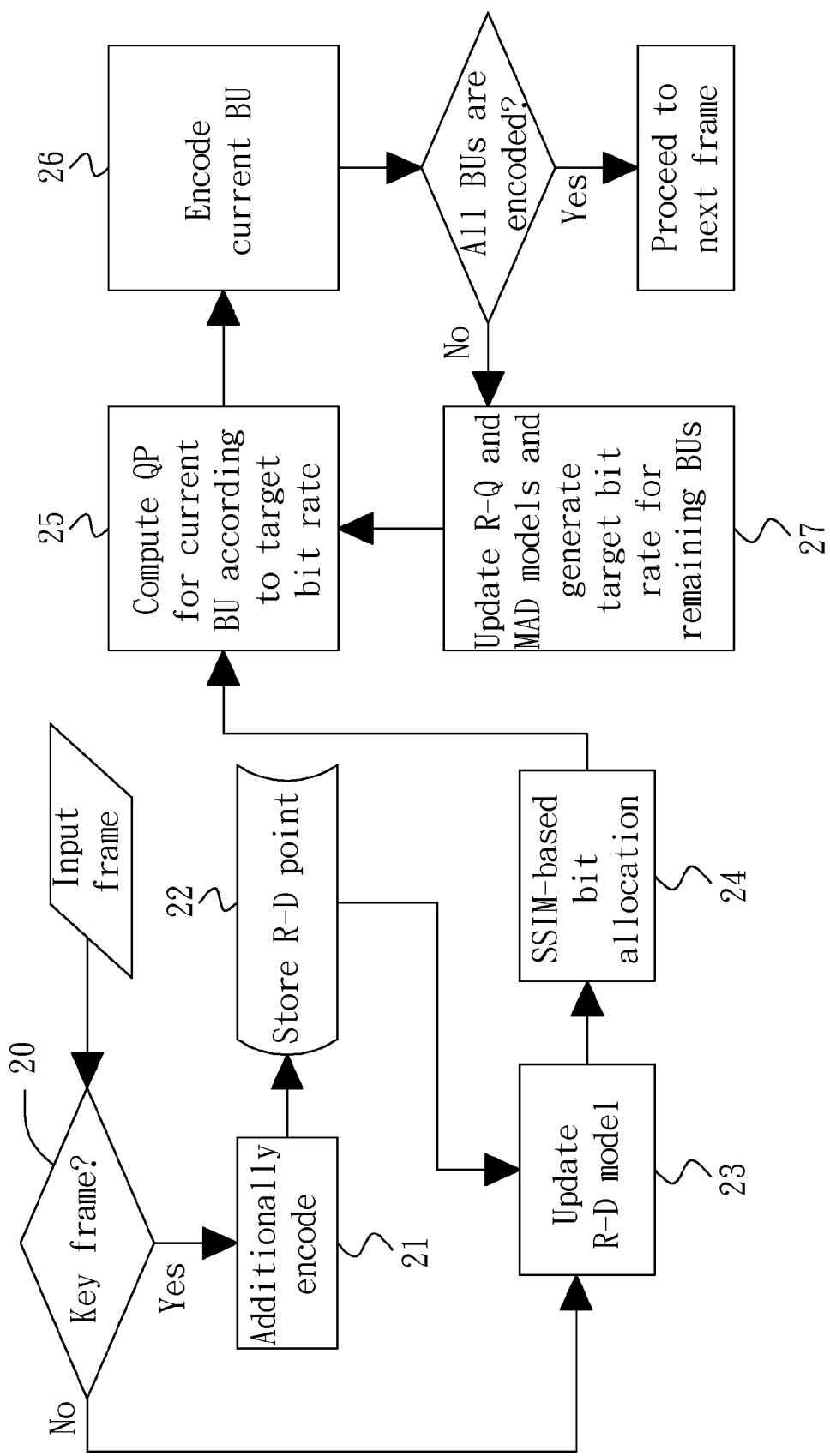
FIG. 2 shows a flow diagram that illustrates a rate control method of perceptual-based rate-distortion (R-D) optimized bit allocation for video coding according to one embodiment of the present invention.

FIG. 2 shows a flow diagram that illustrates a rate control method of perceptual-based rate-distortion (R-D) optimized bit allocation for video coding according to one embodiment of the present invention. In block 20, an input frame is firstly determined as a key frame or a non-key frame. In general, the first frame of a whole video sequence or the first frame of a sub-sequence may be assigned as a key frame. The other frames in the sub-sequence usually have similar R-D characteristics and therefore are non-key frames.

If the input frame is the key frame, it is additionally encoded (block 21) at least one time using different quantization parameter (QP). For example, QP1 is used in the additionally first encoding, QP2 is used in the additionally second encoding, QP3 is used in the additionally third encoding, etc. According to block 21, additional R-D points may be obtained, be stored (block 22) and be used to update the R-D models for subsequent frames since consecutive frames generally have similar R-D characteristics. In another embodiment, the R-D points generated during encoding (block 26) may be stored for updating the R-D models.

Moreover, the additional encoding may be performed twice in order to obtain two different quantization parameters. For example, $(QP_{avg}+\Delta)$ and $(QP_{avg}-\Delta)$ are used to perform additionally encoding, where $QP_{avg}$ is the average QP of all BUs in the previous frame and $\Delta$ is set to a constant, e.g., 3 here.

Subsequently, in block 23, the R-D model of each BU is updated. If the input frame is the non-key frame (block 20), the R-D model is directly updated (block 23). In the embodiment, as the R-D model updating is performed prior to bit allocation (block 24), the R-D model is updated according to a previous frame or frames. In other words, the R-D model is updated based on temporal correlation. In another embodiment, however, the R-D model is updated according to a previous BU or BUs in the current frame. In other words, the R-D model is updated based on spatial correlation.

In the embodiment, the updated model parameters $\alpha^*$ and $\beta^*$ are obtained by minimizing $$\sum_{k=1}^{|D|} \tilde{d}_k (\ln \tilde{d}_k - \alpha - \beta \tilde{r}_k)^2$$

where $\tilde{r}$ is encoded bits of an encoded BU, $\tilde{d}$ is encoded distortion of the encoded BU, D is a set of data points for updating the R-D model of the BU, and |D| is the number of data points in D.

The updated model parameters $\alpha^*$ and $\beta^*$ may be obtained according to least mean square error (LMSE) by regression. For example, the updated model parameters $\alpha^*$ and $\beta^*$ may be obtained by taking the gradient of the preceding formula and setting it to zero:

$$\alpha^* = \frac{\sum_{k=1}^{|D|} (\tilde{r}_k^2 \tilde{d}_k) \sum_{k=1}^{|D|} (\tilde{d}_k \ln \tilde{d}_k) - \sum_{k=1}^{|D|} (\tilde{r}_k \tilde{d}_k) \sum_{k=1}^{|D|} (\tilde{r}_k \tilde{d}_k \ln \tilde{d}_k)}{\sum_{k=1}^{|D|} \tilde{d}_k \sum_{k=1}^{|D|} (\tilde{r}_k^2 \tilde{d}_k) - \left(\sum_{k=1}^{|D|} \tilde{r}_k \tilde{d}_k\right)^2}$$

$$\beta^* = \frac{\sum_{k=1}^{|D|} (\tilde{d}_k) \sum_{k=1}^{|D|} (\tilde{r}_k \tilde{d}_k \ln \tilde{d}_k) - \sum_{k=1}^{|D|} (\tilde{r}_k \tilde{d}_k) \sum_{k=1}^{|D|} (\tilde{d}_k \ln \tilde{d}_k)}{\sum_{k=1}^{|D|} \tilde{d}_k \sum_{k=1}^{|D|} (\tilde{r}_k^2 \tilde{d}_k) - \left(\sum_{k=1}^{|D|} \tilde{r}_k \tilde{d}_k\right)^2}$$

Afterwards, in block 24, SSIM-based bit allocation is performed to effectively distribute bit budget among BUs such that minimum distortion is achieved. Based on the R-D model, the SSIM-based allocated bit (or target bit rate) may be expressed as $$\min_{r_i} \sum_{i=1}^{N_b} \alpha_i e^{\beta_i r_i} \text{ subject to}$$

$$\sum_{i=1}^{N_b} r_i \leq T_0$$

$$L_i \leq r_i \leq U_i, i = 1, \ldots, N_b$$

where $\alpha_i$ and $\beta_i$ are model parameters of the i-th BU, $r_i$ is the bit budget allocated to the i-th BU, $L_i$ and $U_i$ are the upper and lower bounds of the bit budget for the i-th BU respectively, $T_0$ is the target bit rate for the current frame, and $N_b$ is the number of the BUs in a frame.

The upper and lower bounds in the preceding formula are used to avoid allocating unachievable bit budget and maintain the smoothness of quality between the BUs. In the embodiment, the upper bound of the bit budget for each BU in the current frame is set to the maximum number of bits for encoding one of the BUs in the previous frame. The lower bound of the bit budget is the same for all BUs:

$$L_i = a \frac{c}{f N_b}, \text{ for } i = 1, \ldots, N_b$$

where c is a channel rate, f is a frame rate, and a is a parameter, which is a constant, e.g., 0.5 here.

According to the target bit rate obtained from block 24, the quantization parameter (QP) for the current BU is then computed in block 25. A rate-quantization (R-Q) model is used, in the embodiment, to compute the QP. For simplicity, the quadratic R-Q model employed in the JM reference software is used in the embodiment. The QP for the i-th BU may be obtained by solving quantization step $Q_{step}$ in the following formula, followed by mapping the $Q_{step}$ to QP, for example, by a lookup table in H.264:

$$t_i - H_i^{prev} = b_1 \frac{MAD}{Q_{step}} + b_2 \frac{MAD}{Q_{step}^2}$$

where MAD is a mean absolute difference model, $H_i^{prev}$ is the number of header bits for the i-th BU in the previous frame or frames, $t_i$ is the target bit rate for the i-th BU, $b_1$ and $b_2$ are model parameters. As the header bits $H_i^{prev}$ in the previous frame is usually highly correlated with the header bits $H_i$ in the current frame, $H_i^{prev}$ is taken as an estimator for $H_i$ for simplicity.

For the smoothness of quality, the value of QP for each BU is confined by the following inequality:

$$|QP - QP_{avg}| \leq \delta$$

where $\delta$ is an allowed variation range of QP for each BU, and is a predetermined value, e.g., 3 here.

According to the QP obtained from block 25, the current BU is then encoded in block 26. After encoding, if the encoded BU is not the last BU in the current frame, the flow proceeds to block 27 to update the R-Q model, and update the MAD model if it is included in the R-Q model. If the encoded BU is the last BU in the current frame, proceed to next frame.

In the embodiment, the R-Q model and the MAD model are updated according to a previous BU or BUs in the current frame, i.e., based on spatial correlation. In another embodiment, however, the R-Q model and the MAD model are updated according to a previous frame or frames, i.e., based on temporal correlation. The R-Q model and MAD model updating is disclosed, for example, in a disclosure entitled "Adaptive Basic Unit Layer Rate Control for JVT," Joint Video Team of ISO/IEC JTC1/SC29/WG11 and ITU-T SG16/Q.6 Doc. JVT-G012, Pattaya, Thailand, March 2003, by Z. G. Li et al., the disclosure of which is hereby incorporated by reference.

In addition to updating the R-Q and MAD models in block 27, target bit rate for remaining BUs may be generated according to a method similar to that in block 24. In one embodiment, the allocated bit $r_i^*$ in the beginning of the current frame encoding may be reused for simplifying computation. The target bit rate for the i-th BU may be expressed as follows:

$$t_i = T_{i-1} \frac{r_i^*}{\sum_{k=1}^{N_b} r_k^*}$$

where $T_i$ is the target bit rate for the remaining BUs in the current frame after the i-th BU is encoded.

Although specific embodiments have been illustrated and described, it will be appreciated by those skilled in the art that various modifications may be made without departing from the scope of the present invention, which is intended to be limited solely by the appended claims.

What is claimed is:

1. A rate control method of perceptual-based rate-distortion (R-D) optimized bit allocation, comprising:
   using a coder to perform the steps of:
   determining an input frame as a key frame;
   if the input frame is the key frame, additionally encoding the key frame at least one time, thereby generating a corresponding R-D point;
   updating an R-D model of each basic unit (BU);
   performing perceptual-based bit allocation, thereby generating a target bit rate for each said BU;
   computing a quantization parameter (QP) according to the target bit rate;
   encoding the current BU according to the QP; and
   updating a rate-quantization (R-Q) model if not all the BUs have been encoded;
   wherein the R-D model is expressed as $$D(R) = \alpha e^{-\beta R}$$

where R is a bit rate, D is distortion, $\alpha$ and $\beta$ are model parameters, which are positive;
   wherein the updated model parameters $\alpha^*$ and $\beta^*$ are obtained by minimizing $$\sum_{k=1}^{|D|} \tilde{d}_k (\ln \tilde{d}_k - \alpha - \beta \tilde{r}_k)^2$$

where $\tilde{r}$ is encoded bits of the encoded BU, $\tilde{d}$ is encoded distortion of the encoded BU, D is a set of data points for updating the R-D model of the BU, and |D| is a number of the data points in D.

2. The method of claim 1, wherein a first frame of a whole video sequence or a first frame of a sub-sequence is the key frame.

3. The method of claim 1, further comprising a step of storing the at least one additionally generated R-D point.

4. The method of claim 1, further comprising a step of storing the R-D point generated from the encoded current BU.

5. The method of claim 1, wherein the key frame is additionally encoded using the different QP at each time.

6. The method of claim 5, wherein the key frame is additionally encoded twice to obtain two different said QPs, which are $(QP_{avg}+\Delta)$ and $(QP_{avg}-\Delta)$ respectively, where the $QP_{avg}$ is the average QP of all the BUs in a previous frame and $\Delta$ is a constant.

7. The method of claim 1, wherein the R-D model of each said BU is updated according to a previous frame or frames.

8. The method of claim 1, wherein the R-D model of each said BU is updated according to the previous BU or BUs in the current frame.

9. The method of claim 1, wherein the updated model parameters $\alpha^*$ and $\beta^*$ are obtained according to least mean square error (LMSE) by regression.

10. The method of claim 1, wherein a structural similarity (SSIM) index is based to construct the R-D model for the bit allocation.

11. The method of claim 10, wherein the SSIM-based bit allocation is expressed as $$\min_{r_i} \sum_{i=1}^{N_b} \alpha_i e^{\beta_i r_i}$$

where $\alpha_i$ and $\beta_i$ are model parameters of the i-th BU, $r_i$ is bit budget allocated to the i-th BU, and $N_b$ is a number of the BUs in the frame;
wherein a sum of the bit budget of all the BUs is less than or equal to the target bit rate for the current frame.

12. The method of claim 11, wherein the bit budget for each said BU has an upper bound, which is a maximum number of bits for encoding one of the BUs in the previous frame; and the bit budget for each said BU has a lower bound, which is proportional to a channel rate and is inversely proportional to a frame rate.

13. The method of claim 1, wherein the step of updating the R-Q model further comprises:
   updating a mean absolute difference (MAD) model.

14. The method of claim 13, wherein the QP is computed using the R-Q model.

15. The method of claim 14, wherein the step of computing the QP comprises:
   solving the R-Q model of multi-degree to obtain a quantization step, wherein the R-Q model includes the MAD model; and
   obtaining the QP by mapping the quantization step to the QP by a lookup table.

16. The method of claim 15, wherein an absolute difference between the QP and the average QP is less than or equal to a predetermined value.

17. The method of claim 13, wherein the R-Q model and the MAD model are updated according the previous BU or BUs in the current frame.

18. The method of claim 13, wherein the R-Q model and the MAD model are updated according the previous frame or frames.

19. The method of claim 13, wherein the step of updating the R-Q model and the MAD model further comprises:
   generating the target bit rate for the remaining BUs in the current frame.

20. The method of claim 19, in the step of generating the target bit rate for the remaining BUs in the current frame, the allocated bit $r_{i*}$ in the beginning of the current encoded frame is reused, and the target bit rate for the i-th BU is expressed as follows:

$$t_i = T_{i-1} \frac{r_i^*}{\sum_{k=1}^{N_b} r_k^*}$$

where $T_i$ is the target bit rate for the remaining BUs in the current frame after the i-th BU is encoded.

* * * * *